Oct. 6, 1936.  R. MAYNE  2,056,406
IMITATION LEATHER AND METHOD OF MAKING THE SAME
Filed Sept. 2, 1933
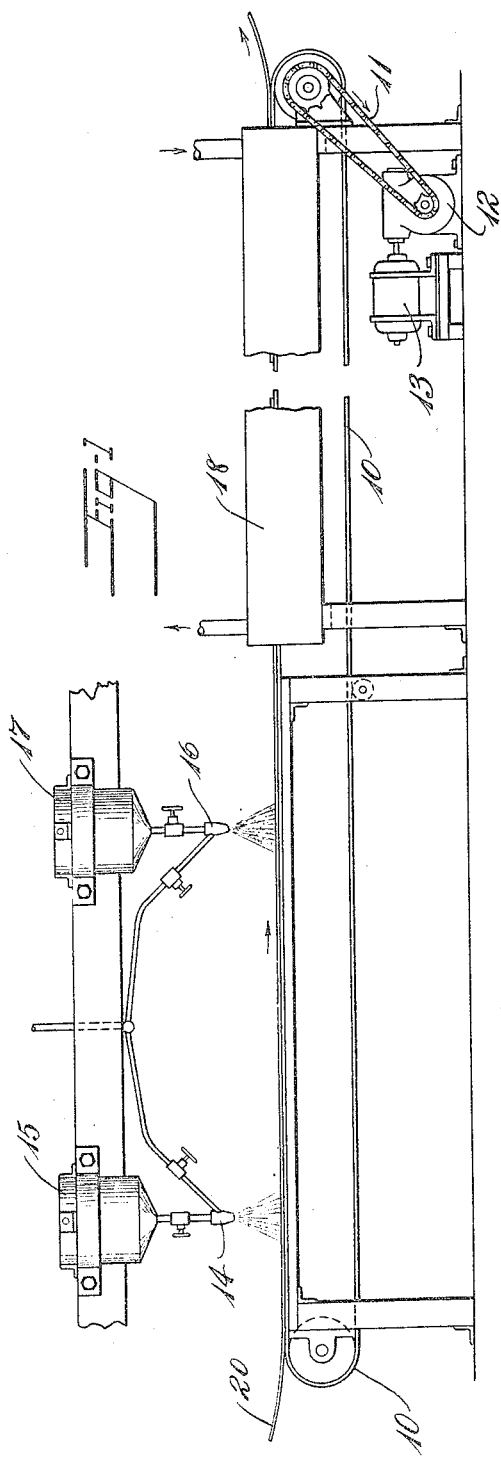
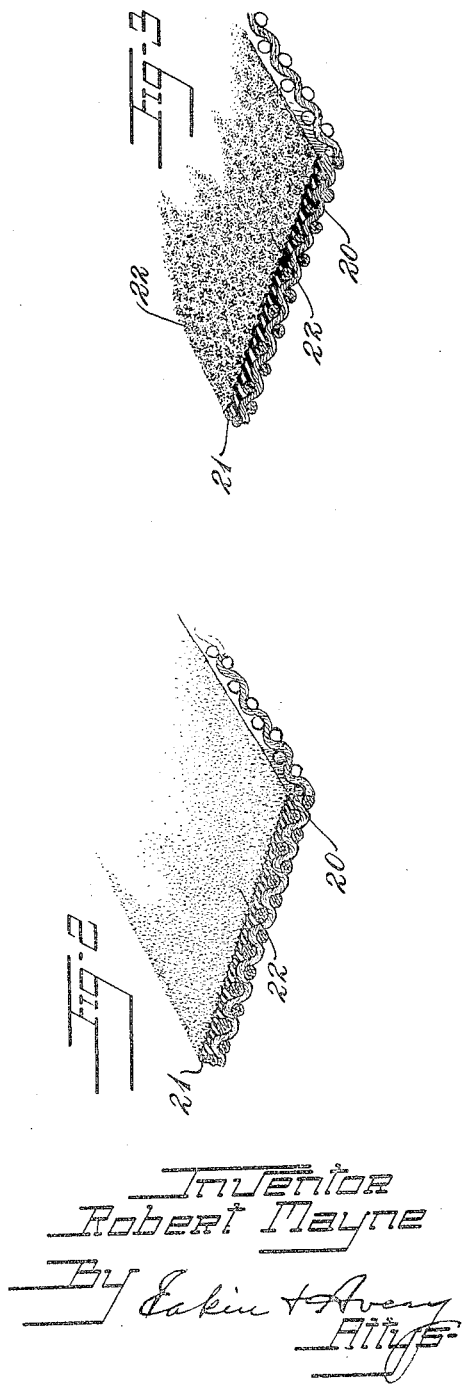
Inventor
Robert Mayne
By Eakin & Avery
Attys.

Patented Oct. 6, 1936

2,056,406

UNITED STATES PATENT OFFICE 2,056,406

IMITATION LEATHER AND METHOD OF MAKING THE SAME

Robert Mayne, Akron, Ohio, assignor to The B. F. Goodrich Company, New York, N. Y., a corporation of New York Application September 2, 1933, Serial No. 688,036

21 Claims. (Cl. 91—68)

This invention relates to the manufacture of articles having a surface comprising rubber and resembling certain types of so-called undressed leathers such as suede, pebbled, or grained leathers, and has for its principal object the provision of a simple, economical, and efficient method of making such a product which may be used in many applications as a substitute for leather as well as in other instances where a sheet or article having a rough rubber surface is useful.

In brief, the preferred method of the present invention comprises depositing upon the surface of a base member a multitude of separate globules or droplets of liquid rubber latex and coagulating the globules upon the base surface to provide thereon a multitude of relatively small, irregularly shaped, adherent coagula of latex rubber, the procedure being carried out in such manner as to preclude the formation of a continuous or smooth latex film and to insure the uniform distribution of the coagula over the base surface and their isolation each from the others to provide a unique rough surface.

The invention will be described more fully with reference to the accompanying drawing in which Fig. 1 is a diagrammatic side elevation of apparatus suitable for carrying out the method of my invention, and Figs. 2 and 3 are enlarged sectional views of products made according to my novel method.

Referring to the drawing, the apparatus illustrated comprises an endless horizontal belt conveyor 10 driven through a sprocket chain 11, and variable speed control unit 12 by a motor 13. Disposed above and near one end of the conveyor is a series of sprays 14 directed toward the surface of the conveyor belt and connected to a fluid coagulant supply tank 15. Further along the belt in the direction of its horizontal movement is provided a second similarly positioned series of sprays 16 connected to a latex supply tank 17. The portion of the upper reach of the conveyor belt beyond the two sprays is enclosed by a tunnel dryer and/or vulcanizer 18, suitably heated as by circulating hot air.

In manufacturing artificial leather, for example, a continuous sheet of fabric 20 is coated with an adhesive rubber composition 21 in any convenient manner, as by calendering a coating of masticated rubber onto the fabric, or by dipping the fabric into a bath of rubber cement or an aqueous dispersion of rubber, or by spreading or otherwise applying such an adhesive to form a rubber coating upon the fabric. The rubberized fabric then is fed onto the conveyor of the apparatus described above which is caused to travel at a lineal speed of about fifteen feet per minute and as it is carried along by the conveyor, the fabric is sprayed across its entire width with a liquid coagulant such as acetic or formic acid, or a dehydrant such as alcohol or acetone, or a solution of a polyvalent metal salt in a volatile organic solvent, or other material which will coagulate an aqueous dispersion of rubber. An aqueous solution containing 15% of formic acid delivered by an ordinary liquid spray gun operated by air at about 25 pounds per square inch pressure is satisfactory. The coagulant spray preferably is so adjusted with reference to the horizontal speed of the conveyor that the entire surface of the rubberized fabric is substantially uniformly covered with fine droplets of the coagulant, although greater quantities sufficient even to form a continuous film of coagulant are not prohibited. Adjustment of the spray gun to deliver the requisite volume of coagulant is most easily governed by observation, but as an indication of a suitable quantity, it has been found that excellent results are produced when the spray is adjusted to deliver 200 c. c. of coagulant solution per minute uniformly distributed over a surface one foot wide travelling past the spray at the rate of fifteen feet per minute. The coagulant-bearing rubberized fabric then is sprayed with latex over its entire width, the apparatus preferably being adjusted to deliver a fine spray so that the droplets of latex deposited upon the fabric will be relatively small and well distributed over the surface. The conveyor should preferably be driven at such a rate of speed that the latex will be applied as separate discrete globules or droplets and the total quantity of latex applied to a given surface area should be insufficient to form or build up a continuous or smooth film upon the surface. As with the coagulant spray, adjustment of the latex spray to accomplish the necessary application of discrete droplets is best governed by observation, but satisfactory artificial leather may be produced by operating under the following conditions. The spray or sprays may be guns of the type made and sold by the Paasche Air Brush Company under the designation "U B. R. F—2" or any of the other commercially available guns designed especially to spray liquid rubber latex. The guns may be operated by air at a pressure of about 25 pounds per square inch and should be adjusted to deliver about 100 grams of liquid latex per minute spread over an area about one foot wide travelling past the spray at the indicated rate of fifteen feet per minute. The latex may be the ordinary concentrated latex of commerce having a viscosity about twice that of water and containing 50 to 60% total solids including necessary vulcanizing ingredients if desired. As the separate droplets of liquid latex strike the coagulant upon the surface, they are coagulated immediately to form discrete latex rubber coagula 22 of varying size and irregular shape adhering to and projecting from the tacky rubber surface. Thereafter the coagula are dried as they pass through the tunnel dryer and the rubber embodied in the artificial leather is vulcanized in any desirable manner. The latex rubber coagula do not soften or flow to any appreciable extent when heated during drying and vulcanization and accordingly retain their erect isolated positions in the finished product.

If the latex is sprayed in an extremely fine state to deposit very small coagula in closely relationed, although definitely spaced apart positions, the finished product (illustrated in Fig. 2) presents a rough, but soft and sometimes almost fuzzy appearance and feel which closely resembles suede leather. If, however, the latex is applied in somewhat larger droplets, the coagula tend to be flatter and the product (illustrated in Fig. 3) resembles pebbled or grained leathers rather than suede. These varying results are readily obtainable by varying and suitably correlating several factors which contribute to produce the different results, namely, character and velocity of the coagulant spray, character and velocity of the latex spray, speed of the conveyor, and to some extent even the temperature of the rubber surface upon which the latex is deposited as well as the temperature of the atmosphere through which the latex spray passes. Obviously, precise instructions concerning the regulation and control of these several factors cannot be given here, but the desired results may be achieved readily after experimentation to determine the optimum conditions in any particular case.

In an alternative method, the latex is sprayed through an atmosphere or mist of coagulant so that the latex globules are partially or wholly coagulated before they are deposited upon the article surface. This may be accomplished for example, by placing the two series of spray nozzles near each other and directing the spray streams of latex and of coagulant so that they will converge above the surface of the article. In this case, as before, the volume of latex applied, the velocity of the spray, and the speed of the article with reference to the spray, all should preferably be so adjusted that the quantity of latex coagula applied will be insufficient to form a continuous film or coating of rubber upon the article surface.

Products of this invention may be used for a variety of purposes such as upholstering, vehicle tops, clothing, and in numerous other cases where similar real leather or like material has been used heretofore. The invention, however, is by no means limited to the production of fibrous base material as described but may be used in the production of numerous articles where a rough rubber surface of the type described is useful. For example all-rubber sheets and shaped rubber articles of any character whatever may be provided with a rough leather-like surface by utilizing the method of this invention.

It is understood that the term "discrete rubber coagula" and other expressions of like import as used throughout the specification and claims are intended to denote separate agglomera or particle groups of latex or similar rubber having a low temperature coefficient of plasticity, adhered to and projecting individually from the base member, although portions of such agglomera may be in contact with an even adhered to portions of like agglomera so long as substantial portions of the agglomera are separated from surrounding agglomera to provide a rough surface of the type described. The latex or other rubber dispersion from which the coagula are derived may be colored with suitable pigments to provide beautiful decorative effects in the products of this invention. The rubber dispersions likewise may contain any desired fillers, vulcanizing agents, age-resistors, or similar compounding ingredients, and may be thickened, thinned, concentrated, diluted, or otherwise modified as required. The term "rubber" has been used in a generic sense to include caoutchouc, gutta percha, balata, synthetic rubber and similar rubber-like gums or resins.

Although the invention has been described in considerable detail with reference to a preferred procedure, it is obvious that numerous modifications and variations may be made therein without departing from the scope of the invention. For example the coagulant may be applied to the sheet by means of a transfer roll, or simply by flowing a wide thin stream of coagulant onto the sheet. Likewise other means than spraying may be resorted to in applying the latex droplets to the coagulant-bearing surface, as by allowing the liquid latex to drip from a number of outlets arranged above the surface and to fall by gravity downward to the surface. Other modifications will be apparent to one skilled in the art.

I claim:

1. The method of making an article having a surface comprising rubber and resembling undressed leather, which comprises depositing upon and adhering to the surface of a base a multitude of discrete rubber coagula in a quantity insufficient to form upon the surface a smooth continuous rubber film and drying the coagula.

2. The method of making an article having a surface comprising rubber and resembling undressed leather, which comprises coagulating upon the surface of a base a multitude of isolated latex globules to provide upon said base discrete adherent rubber coagula providing a rough surface.

3. The method of making an article having a surface comprising rubber and resembling undressed leather, which comprises applying a coagulant to the surface of a base and thereafter applying to the coagulant-bearing surface a multitude of discrete globules of latex in a quantity insufficient to form upon the surface a continuous film, and drying the resultant separate rubber coagula.

4. The method of making an article having a surface comprising rubber and resembling undressed leather, which comprises applying a coagulant to the surface of a base, spraying latex upon the coagulant-bearing surface in a quantity insufficient to form a continuous film, and drying the resultant adherent rubber coagula.

5. The method of making an article having a surface comprising rubber and resembling undressed leather, which comprises spraying a liquid coagulant on to the surface of a base, spraying latex on to the coagulant-bearing surface in a quantity insufficient to form a continuous film, and drying the resultant adherent rubber coagula.

6. The method of making an article having a surface comprising rubber and resembling undressed leather, which comprises depositing a multitude of discrete rubber coagula upon a base having a surface comprising an adhesive rubber composition, drying the coagula, and vulcanizing the rubber.

7. The method of making an article having a surface comprising rubber and resembling undressed leather, which comprises coagulating a multitude of discrete latex globules upon an unvulcanized rubber surface to provide thereon separate rubber coagula adhering to and projecting from said surface.

8. The method of making an article having a surface comprising rubber and resembling undressed leather, which comprises applying a coagulant to a base comprising an unvulcanized rubber surface, spraying latex onto the coagulant-bearing surface in a quantity insufficient to form a continuous film, drying the resultant discrete rubber coagula, and vulcanizing the article.

9. The method of making an article having a surface comprising rubber and resembling undressed leather, which comprises spraying a coagulant onto a base comprising a tacky rubber surface, spraying latex onto the coagulant-bearing tacky rubber surface in a quantity insufficient to form a continuous film, and drying the resultant rubber coagula.

10. The method of making artificial leather having a surface comprising rubber and resembling undressed leather, which comprises coating a fibrous sheet with an adhesive rubber composition, depositing upon the coated sheet a multitude of discrete rubber coagula, and drying the coagula to provide a rough surface of the desired appearance and characteristics.

11. The method of making artificial leather having a surface comprising rubber and resembling undressed leather, which comprises coating a fibrous sheet with an adhesive rubber composition, applying a coagulant to the coated sheet, depositing a multitude of separate latex globules upon the coagulant-bearing sheet to form thereupon a multitude of adherent discrete rubber coagula, and drying the coagula.

12. The method of making artificial leather having a surface comprising rubber and resembling undressed leather, which comprises coating a fibrous sheet with an adhesive rubber composition, spraying a coagulant onto the coated sheet, spraying latex onto the coagulant-bearing sheet in a quantity insufficient to form a continuous latex film, and drying the resultant rubber coagula.

13. The method which comprises spraying latex in a quantity insufficient to form a continuous film upon a rubber-surfaced base member with which has been associated a quantity of a latex coagulant adequate to coagulate a substantial portion of the applied latex.

14. The method which comprises spraying latex toward the surface of an article and treating the sprayed droplets of latex, before they are deposited upon the article surface, with a latex coagulant to deposit upon said surface a multitude of discrete rubber coagula providing a rough surface, the latex coagula being applied in a quantity insufficient to form a continuous smooth film or coating.

15. An article of manufacture comprising a base member having a rubber surface, and a multitude of discrete rubber coagula adhered to and projecting from said surface, said coagula providing a rough surface resembling undressed leather.

16. An article of manufacture comprising a base member and a multitude of chemically coagulated discrete rubber coagula adhered to and projecting from the surface of said base member, said coagula providing a rough, uneven surface resembling undressed leather.

17. An article of manufacture comprising a base member having a rubber surface, and a multitude of small rubber coagula adhered to and projecting from said rubber surface, said coagula being substantially uniformly distributed over said surface and being closely relationed but definitely spaced apart with respect to each other, providing a rough surface resembling undressed leather.

18. Artificial leather comprising a fibrous sheet base member and a multitude of small discrete rubber coagula adhered to and projecting from the surface of said base member providing a rough surface resembling undressed leather.

19. Artificial leather comprising a fibrous sheet base member, a coating of rubber upon said fibrous base providing a nominally smooth rubber surface, and a multitude of closely relationed but definitely spaced apart discrete small rubber coagula adhered to the rubber coating and providing a rough surface resembling undressed leather.

20. Artificial leather comprising a sheet base member having a rubber surface, and a multitude of chemically coagulated discrete rubber coagula adhered to and projecting from the rubber surface, said coagula together with exposed portions of the base surface constituting a rough uneven surface resembling undressed leather.

21. The method of making an article having a rough surface formed of rubber which comprises providing a base constituting part of the article and having an unvulcanized rubber surface, applying a coagulant to a substantial portion of said base and then directing upon the coagulant-bearing portion of said base a stream of discrete globules of liquid rubber latex for a brief time insufficient to form thereon a continuous film but only to deposit a multitude of discrete globules of latex which upon contacting with the coagulant-coated base are coagulated in-situ to produce separate protruding rubber coagula of irregular configurations adhered to the base, and drying the separate coagula.

ROBERT MAYNE.